(12) United States Patent
Iguchi et al.

(10) Patent No.: US 11,894,194 B2
(45) Date of Patent: Feb. 6, 2024

(54) DIELECTRIC COMPOSITION AND MULTILAYER CERAMIC ELECTRONIC DEVICE

(71) Applicant: TDK CORPORATION, Tokyo (JP)

(72) Inventors: Toshihiro Iguchi, Tokyo (JP); Tomoaki Nonaka, Tokyo (JP); Takeshi Shouji, Tokyo (JP)

(73) Assignee: TDK CORPORATION, Tokyo (JP)

( * ) Notice: Subject to any disclaimer, the term of this patent is extended or adjusted under 35 U.S.C. 154(b) by 57 days.

(21) Appl. No.: 17/876,162

(22) Filed: Jul. 28, 2022

(65) Prior Publication Data

US 2023/0090201 A1 Mar. 23, 2023

(51) Int. Cl.
| | |
|---|---|
| H01G 4/12 | (2006.01) |
| H01G 4/30 | (2006.01) |
| H01G 4/012 | (2006.01) |
| C04B 35/468 | (2006.01) |
| H01G 4/008 | (2006.01) |

(52) U.S. Cl.
CPC ....... *H01G 4/1227* (2013.01); *C04B 35/4682* (2013.01); *H01G 4/008* (2013.01); *H01G 4/012* (2013.01); *H01G 4/30* (2013.01); *C04B 2235/3208* (2013.01); *C04B 2235/768* (2013.01); *C04B 2235/96* (2013.01)

(58) Field of Classification Search
CPC ........ C04B 35/4682; C04B 2235/3208; C04B 2235/768; C04B 2235/96; H01G 4/008; H01G 4/012; H01G 4/1227; H01G 4/30
See application file for complete search history.

(56) References Cited

U.S. PATENT DOCUMENTS

| | | | |
|---|---|---|---|
| 2003/0186802 A1 | 10/2003 | Watanabe et al. | |
| 2012/0033344 A1* | 2/2012 | Nakamura | C04B 35/4682 501/137 |
| 2021/0183573 A1* | 6/2021 | Iguchi | C04B 35/481 |
| 2022/0254569 A1* | 8/2022 | Ariizumi | C04B 35/4682 |
| 2022/0254570 A1* | 8/2022 | Ariizumi | H01G 4/1227 |
| 2022/0380257 A1* | 12/2022 | Iguchi | C04B 41/00 |
| 2023/0303451 A1* | 9/2023 | Iguchi | C04B 35/49 501/136 |

FOREIGN PATENT DOCUMENTS

| | | | |
|---|---|---|---|
| JP | 2021054686 A | * | 4/2021 |
| WO | 02/00568 A1 | | 1/2002 |

* cited by examiner

*Primary Examiner* — Nathan Milakovich
(74) *Attorney, Agent, or Firm* — Oliff PLC

(57) ABSTRACT

A dielectric composition includes a dielectric grain including a perovskite compound and a first segregation phase including at least Ca, Al, Si, and O.

9 Claims, 2 Drawing Sheets

DIELECTRIC COMPOSITION AND MULTILAYER CERAMIC ELECTRONIC DEVICE

TECHNICAL FIELD

The present disclosure relates to a dielectric composition and a multilayer ceramic electronic device including the dielectric composition.

BACKGROUND

As shown in Patent Literature 1, a multilayer ceramic electronic device including ceramic layers composed of a dielectric composition is known. In such a multilayer ceramic electronic device, defects (e.g., cracks) may be caused in its element body including the dielectric composition. Possible causes of the defects include bends in a circuit board, difference in linear expansion coefficients of the ceramic layers and internal electrode layers, or external force or stress applied to the element body. Particularly, low fracture toughness of the dielectric composition may cause chips in corners of the element body or cracks inside the element body during barrel polishing in a manufacturing process.

Patent Literature 1: WO 2002/000568

SUMMARY

The present disclosure has been achieved under such circumstances. It is an object of the present disclosure to provide a dielectric composition having high fracture toughness and a multilayer ceramic electronic device including the dielectric composition.

To achieve the above-mentioned object, a dielectric composition according to the present disclosure includes
  a dielectric grain including a perovskite compound, and
  a first segregation phase including at least Ca, Al, Si, and O.

In the dielectric composition of the present disclosure, it is assumed that inclusion of the first segregation phase containing the predetermined elements increases inter-dielectric-grain joint strength. It is also assumed that, even if a crack initiation point is produced inside the dielectric composition, the first segregation phase can prevent crack growth. Consequently, the dielectric composition of the present disclosure has high fracture toughness.

Preferably, a molar ratio (Al/(Al+Si)) of Al to a total of Al and Si in the first segregation phase is 0.55 or more and 0.75 or less.

Preferably, the perovskite compound is represented by $ABO_3$,
  A-site of $ABO_3$ includes Ca and/or Sr,
  B-site of $ABO_3$ includes Zr and/or Ti,
  a molar ratio of Ca in the A-site to the entire A-site, which is assumed to be 1 mol, is 0.5 or more, and
  a molar ratio of Zr in the B-site to the entire B-site, which is assumed to be 1 mol, is 0.8 or more.

In other words, the perovskite compound composed of the dielectric grain is preferably calcium zirconate, calcium and strontium zirconate, or the like, compared to barium titanate. Including the above perovskite compound as a main component of the dielectric composition can further enhance the effects of increasing the fracture toughness produced by the first segregation phase.

Preferably, a molar ratio (Ca/(Zr+Ti)) of Ca to a total of Zr and Ti in the first segregation phase is 1.50 or more, and the molar ratio Ca/(Zr+Ti) in the first segregation phase is higher than that in the dielectric grain.

Preferably, the dielectric composition further includes a second segregation phase, and
  the second segregation phase includes at least Ca, Si, and O and substantially excludes Al.
  (Ca+Sr)/(Zr+Ti) denotes a molar ratio of a total of Ca and Sr to a total of Zr and Ti in the second segregation phase,
  Si/(Zr+Ti) denotes a molar ratio of Si to the total of Zr and Ti in the second segregation phase,
  (Ca+Sr)/(Zr+Ti) is preferably 1.15 or more, and
  Si/(Zr+Ti) is preferably 0.10 or more.

Preferably, the first segregation phase includes first segregation phases having an average grain size of 0.10 μm or more and 2.50 μm or less.

Preferably, the first segregation phase is included at a number ratio of 0.0005 or more and 0.0100 or less per μm$^2$ in a cross section of the dielectric composition.

A multilayer ceramic electronic device including the dielectric composition of the present disclosure exhibits high durability against external force or impact. In other words, in the multilayer ceramic electronic device of the present disclosure, defects (e.g., cracks) of its element body can be sufficiently prevented.

BRIEF DESCRIPTION OF THE DRAWING(S)

DETAILED DESCRIPTION

Figure 1:
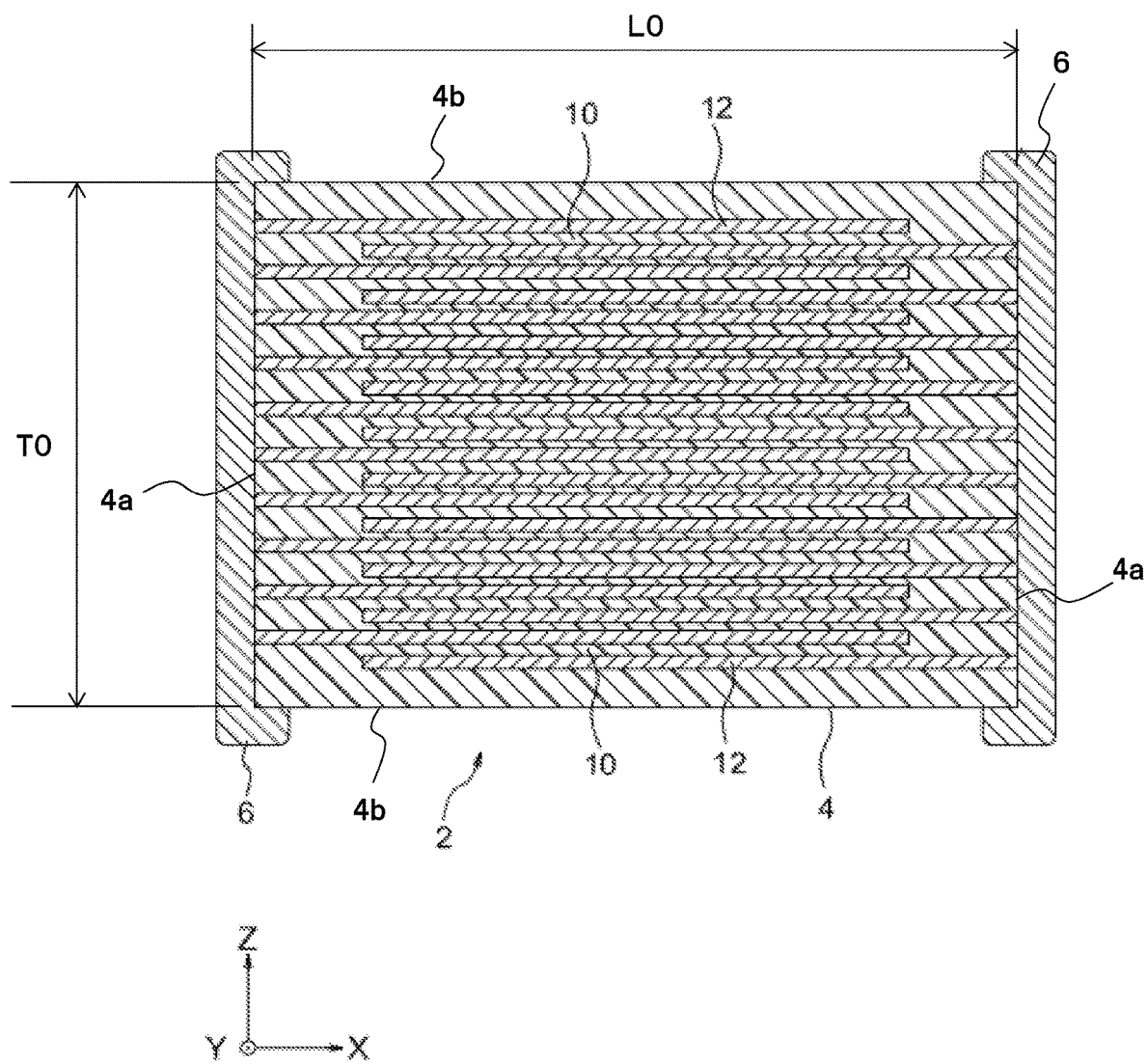
FIG. 1 is a schematic view of a cross section of a multilayer ceramic capacitor according to an embodiment of the present disclosure.

In the present embodiment, a multilayer ceramic capacitor 2 shown in FIG. 1 is described as an example of a ceramic electronic device according to the present disclosure. The multilayer ceramic capacitor 2 includes an element body 4 and a pair of external electrodes 6 formed on outer surfaces of the element body 4.

The element body 4 shown in FIG. 1 normally has a substantially rectangular parallelepiped shape and includes two end surfaces 4a facing each other in the X-axis direction, two side surfaces 4b facing each other in the Y-axis direction, and two side surfaces 4b facing each other in the Z-axis direction. The element body 4 may have any other shapes, such as an elliptic cylinder shape, a cylindrical shape, and a prismatic shape. The element body 4 may have any external dimensions. For example, the element body 4 may have a length L0 of 0.4 to 5.7 mm in the X-axis direction, a width W0 of 0.2 to 5.0 mm in the Y-axis direction, and a height T0 of 0.2 to 3.0 mm in the Z-axis direction. In the present embodiment, the X-axis, the Y-axis, and the Z-axis are perpendicular to each other.

The element body 4 includes ceramic layers 10 and internal electrode layers 12 substantially parallel to the plane containing the X-axis and the Y-axis. Inside the element body 4, the ceramic layers 10 and the internal electrode layers 12 are laminated alternately along the Z-axis direction. "Substantially parallel" means that the ceramic layers 10 and the internal electrode layers 12 are mostly parallel to the plane but may partly be slightly nonparallel. The ceramic layers 10 and the internal electrode layers 12 may slightly be uneven or inclined.

The ceramic layers 10 are made of a dielectric composition described later. The average thickness (interlayer thickness) per ceramic layer 10 is not limited. For example, the average thickness may be 100 μm or less and is preferably 30 μm or less. The number of the ceramic layers 10 is not limited and is determined based on desired characteristics. For example, the number of the ceramic layers 10 may be 20 or more, and preferably 50 or more.

The internal electrode layers 12 are laminated between the ceramic layers 10, and the number of the internal electrode layers 12 is determined based on the number of the ceramic layers 10. The average thickness per internal electrode layer 12 is not limited and may be, for example, 3.0 μm or less. The average thickness of the ceramic layers 10 and the average thickness of the internal electrode layers 12 are calculated by observing a cross section shown in FIG. 1 using a metallurgical microscope and measuring the thickness of each layer (10, 12) at five points or more.

The internal electrode layers 12 are laminated along Z-axis so as to be exposed on either one of the end surfaces 4a (see FIG. 1). The pair of external electrodes 6 is formed on the end surfaces 4a of the element body 4 and is electrically connected to the exposed ends of the internal electrode layers 12. Since the multilayer ceramic capacitor 2 has a laminated structure as shown in FIG. 1, the external electrodes 6 and the internal electrode layers 12 constitute a capacitor circuit. That is, the ceramic layers 10 inside the capacitance region are sandwiched between the internal electrode layers 12 having different polarities, and a voltage can be applied to the ceramic layers 10.

The internal electrode layers 12 are made of a conductive material and preferably include Ni as a main component. Specifically, the conductive material of the internal electrode layers 12 preferably includes pure Ni or a Ni-based alloy containing Ni by 85 wt % or more. The Ni-based alloy may include one or more elements selected from Mn, Cu, Cr, etc. The internal electrode layers 12 may also include, as an inhibitor, particles of a perovskite compound having the same composition as a main component of the ceramic layers 10, in addition to the conductive material. The internal electrode layers 12 may further include a trace amount (e.g., about 0.1 mass % or less) of non-metal elements, such as S and P, and may also include a void. When the internal electrode layers 12 include the inhibitor, the void, or the like, the internal electrode layers 12 may be intermittent in the cross section of the element body 4 as shown in FIG. 1 (i.e., the conductive material may be present intermittently along the X-axis direction).

Each of the pair of external electrodes 6 may include a baked electrode layer, a resin electrode layer, a plating electrode layer, or the like and may be composed of a single electrode layer or a plurality of laminated electrode layers. For example, each external electrode 6 may have a triple-layer structure of a baked electrode layer—a Ni plating layer—a Sn plating layer (laminated in this order). In this case, the Sn plating layer is located on the outermost surface of the external electrode 6. This makes the external electrodes 6 have good solder wettability.

As shown in FIG. 1, each external electrode 6 integrally includes an end surface part formed on the corresponding end surface 4a of the element body 4, and extended parts each formed at one end of one of the four side surfaces 4b of the element body 4 in the X-axis direction. That is, each of the pair of external electrodes 6 is formed so as to extend from the end surface 4a to the side surfaces 4b of the element body 4. The external electrodes 6 are insulated from each other so as not to be in contact with each other in the X-axis direction.

The extended parts of the external electrodes 6 are not necessarily formed, and each external electrode 6 may include only the end surface part. Alternatively, when the multilayer ceramic capacitor 2 is to be surface-mounted on a substrate, the extended parts of the external electrodes 6 are formed at least on the side surface 4b facing a mounting surface of the substrate at the shortest distance and are not necessarily formed on the side surface 4b opposite the mounting surface.

Next, the dielectric composition of the ceramic layers 10 is explained in detail.

The dielectric composition of the ceramic layers 10 includes a perovskite compound represented by a general formula of $ABO_3$ as the main component. The main component of the ceramic layers 10 (the main component of the dielectric composition) means a component occupying 80 mol % or more of the ceramic layers 10. Examples of the perovskite compound include barium titanate, calcium titanate, strontium titanate, calcium zirconate, calcium and strontium zirconate, and strontium zirconate.

In the present embodiment, preferably, the perovskite compound (the main component) satisfies a composition formula of $(Ca_{(1-\alpha-\beta)}Sr_\alpha Ba_\beta)_m(Zr_{(1-\gamma-\delta)}Ti_\gamma Hf_\delta)O_3$. In the composition formula, $\alpha$, $\beta$, $\gamma$, $\delta$, and m are element ratios.

"m" indicates the element ratio of the A-site to the B-site and may be in a range of 1.0 to 1.1.

"$\alpha$" indicates the element ratio of Sr in the A-site, and "$\beta$" indicates the element ratio of Ba in the A-site. Preferably, the A-site in the present embodiment mainly includes Ca and/or Sr. Specifically, the element ratio $(1-\alpha-\beta)$ of Ca in the A-site is preferably 0.5 or more and 1.0 or less, and more preferably 0.6 or more and 1.0 or less. "$\alpha$" is preferably 0 or more and 0.5 or less, and is more preferably 0 or more and 0.4 or less. "$\beta$" is preferably 0 or more and 0.2 or less.

"$\gamma$" indicates the element ratio of Ti in the B-site, and "$\delta$" indicates the element ratio of Hf in the B-site. Preferably, the B-site in the present embodiment mainly includes Zr. Specifically, the element ratio $(1-\gamma-\delta)$ of Zr in the B-site is preferably 0.8 or more and 1.0 or less, and more preferably 0.9 or more and 1.0 or less. "$\gamma$" is preferably 0 or more and 0.2 or less, and is more preferably 0 or more and 0.1 or less. Hf is normally an inevitable impurity, and "$\delta$" is preferably 0.03 or less.

The element ratio of oxygen (O) in the composition formula may slightly deviate from the stoichiometric composition.

In addition to the main component, the ceramic layers 10 may also include subcomponents, such as Mn compounds, Mg compounds, Cr compounds, Ni compounds, rare earth element compounds, Si compounds, Li compounds, B compounds, V compounds, Al compounds, and Ca compounds. There is no limit to the type, combination, or addition amount of the subcomponents.

The component composition of the ceramic layers 10 is analyzed using inductively coupled plasma emission spectroscopy (ICP), laser ablation ICP mass spectrometry (LA-ICP-MS), X-ray fluorescence analysis (XRF), energy dispersive X-ray spectroscopy (EDX), an electron probe microanalyzer (EPMA) equipped with a wavelength dispersive X-ray spectrometer (WDS), or the like.

Figure 2:
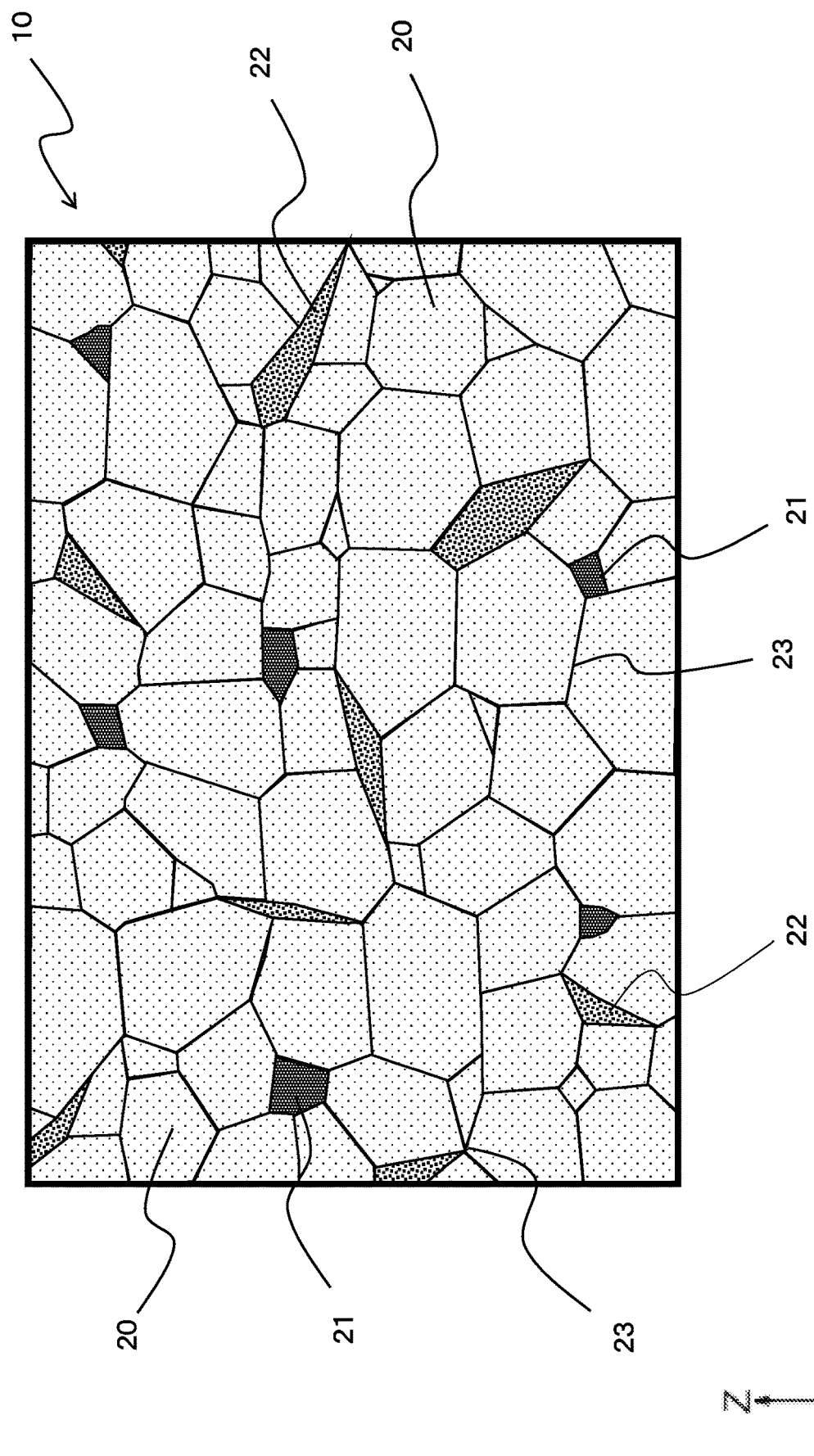
FIG. 2 is an enlarged cross-sectional view of ceramic layers 10 shown in FIG. 1.

The ceramic layers 10 including the above components have an internal texture shown in FIG. 2. The ceramic layers 10 include dielectric grains 20 (base phases), segregation phases 21 and 22 having predetermined characteristics, and grain boundaries 23 between the dielectric grains 20.

The dielectric grains 20 include the main component (the perovskite compound) of the ceramic layers 10. When the ceramic layers 10 include the subcomponents, the subcomponents, as well as the main component, may be solid-soluted in the dielectric grains 20. The dielectric grains 20 may have a core-shell structure by solid solution of the subcomponents. The dielectric grains 20 may have an average size of 1 μm or less, and preferably have an average size of 0.20 to 2.00 μm.

The average size of the dielectric grains 20 can be measured by observing a cross section of the ceramic layers 10 shown in FIG. 2 using a scanning electron microscope (SEM), a scanning transmission electron microscope (STEM), or the like and performing an image analysis of a given cross-sectional photograph. For example, the average size of the dielectric grains 20 is calculated by measuring the equivalent circular diameters of at least five dielectric grains 20.

The ceramic layers 10 of the present embodiment include the first segregation phases 21 as shown in FIG. 2. The first segregation phases 21 are composite oxide phases including at least Ca, Al, Si, and O (oxygen). In addition to these elements, the first segregation phases 21 may include the constituent elements of the ceramic layers 10 (e.g., Sr, Ba, Zr, Ti, and Hf included in the main component, and the subcomponent elements). Inclusion of the first segregation phases 21, which contain Ca, Al, Si, and O, in the dielectric composition increases the fracture toughness of the dielectric composition and can prevent defects (e.g., cracks) of the ceramic layers 10.

The first segregation phases 21 can be identified through a combination of mapping analysis and point analysis with SEM-EDX or SEM-WDS. For example, the mapping analysis is performed in a cross section of the element body 4 shown in FIG. 2 to identify regions where Al and Si are overlappingly segregated using a mapping image of Al and a mapping image of Si. The "regions where Al and Si are overlappingly segregated" mean regions having a higher Al concentration and a higher Si concentration than the dielectric grains 20, and can be visually identified by superimposing the mapping images of Al and Si.

After the "regions where Al and Si are overlappingly segregated" are identified, the point analysis of the identified regions is performed to examine whether Ca is included in the regions. Ca is a constituent element of the main component of the ceramic layers 10. In the point analysis of the identified regions, Ca is affected by the dielectric grains 20 around the identified regions. Thus, when the identified regions are analyzed with EDX to examine whether Ca is included in the regions, the molar ratio (Ca/(Zr+Ti)) of Ca to the total of Zr and Ti is measured. Specifically, Ca/(Zr+Ti) in the identified regions and Ca/(Zr+Ti) in the dielectric grains 20 are measured and compared. When Ca/(Zr+Ti) in the identified regions is higher than that in the dielectric grains 20, the identified regions can be deemed to include Ca. The identified regions can thus be deemed to be the first segregation phases 21 in the present embodiment.

When composition analysis at a higher resolution than SEM is performed by STEM, TEM, or the like, the composition of the segregation phases may be identified without being affected by the dielectric grains 20 around the segregation phases.

Preferably, the first segregation phases 21 identified by SEM-EDX or the like have predetermined element ratios. Specifically, the molar ratio (Al/(Al+Si)) of Al to the total of Al and Si in the first segregation phases 21 is preferably 0.55 or more and 0.75 or less. Assuming that the total amount of elements except for oxygen in the first segregation phases 21 is 100 mol, the sum of the amounts of Al and Si is 20 mol % or more and is preferably 30 mol % or more. Ca/(Zr+Ti) in the first segregation phases 21 is preferably 1.50 or more, and more preferably 2.00 or more. Because Zr and Ti may not be substantially included in the first segregation phases 21, the upper limit of Ca/(Zr+Ti) in the first segregation phases 21 is not limited.

The first segregation phases 21 satisfying the above-mentioned predetermined element ratios further increase the fracture toughness of the dielectric composition.

Although the detailed composition of the first segregation phases 21 is not limited, the first segregation phases 21 preferably have a tetragonal crystal system. Examples of a tetragonal composite oxide containing Ca, Al, and Si include $Ca_2Al(AlSiO_7)$. When the first segregation phases have a tetragonal crystal system, the fracture toughness of the dielectric composition is further improved.

The first segregation phases 21 may have an average grain size of 4.0 μm or less, preferably 0.10 μm or more and 2.50 μm or less, and more preferably 0.10 μm or more and 1.0 μm or less. The average grain size of the first segregation phases 21 is preferably within a range of 0.1 to 0.9 times the average size of the dielectric grains 20. The average grain size of the first segregation phases 21 is calculated by identifying at least five first segregation phases 21 with EDX or WDS and then measuring the equivalent circular diameters of the identified first segregation phases 21 with image analysis.

In the present embodiment, the number ratio of the first segregation phases 21 in the dielectric composition (the ceramic layers 10) is defined using the number (N1) of the first segregation phases 21 included in a unit cross-sectional area (per $μm^2$) of the dielectric composition. N1 may be 0.0004 or more per $μm^2$, preferably 0.0005 or more and 0.0100 or less per $μm^2$, and more preferably 0.0007 or more and 0.0050 or less per $μm^2$. N1 is calculated by dividing a cross section of the ceramic layers 10 as shown in FIG. 2 into multiple fields of view and observing them with SEM or STEM, and measuring the number of the first segregation phases 21 included in at least a total of 1000 $μm^2$ of the cross section.

When the first segregation phases 21 satisfy the above-mentioned favorable ranges of the average grain size and the number ratio, the fracture toughness of the dielectric composition is further improved and the dielectric composition has high relative permittivity.

Preferably, the ceramic layers 10 of the present embodiment include the second segregation phases 22 having predetermined characteristics in addition to the first segregation phases 21. The second segregation phases 22 are composite oxide phases including at least Ca, Si, and O (oxygen). Unlike the first segregation phases 21, the second segregation phases 22 substantially exclude Al. "Substantially exclude Al" means, specifically, Al/(Al+Si) in the second segregation phases 22 is 0.10 or less.

Similarly to the first segregation phases 21, the second segregation phases 22 can be identified through a combination of mapping analysis and point analysis with SEM-EDX or SEM-WDS. In the analysis of the second segregation phases 22, regions where Si is segregated in a mapping image of Si are identified. The "regions where Si is segregated" mean regions having a higher Si concentration than the dielectric grains 20, and can be visually identified in the mapping image of Si.

After the "regions where Si is segregated" are identified, the point analysis of the identified regions is performed to measure the amount of Al and Ca/(Zr+Ti). When Al/(Al+Si) in the identified regions is 0.10 or less and Ca/(Zr+Ti) in the identified regions is higher than that of the dielectric grains 20, the identified regions can be deemed to include Ca and Si and substantially exclude Al. The second segregation phases 22 in the ceramic layers 10 can thus be identified using the above-mentioned method.

The composition analysis of the second segregation phases 22 may be performed by, for example, STEM or TEM having a higher resolution than SEM. In that case, the composition of the second segregation phases 22 may be identified without being affected by the dielectric grains 20 around the second segregation phases 22.

Preferably, the second segregation phases 22 have predetermined element ratios. Specifically, (Ca+Sr)/(Zr+Ti) denotes the molar ratio of the total of Ca and Sr to the total of Zr and Ti in the second segregation phases 22, and Si/(Zr+Ti) denotes the molar ratio of Si to the total of Zr and Ti in the second segregation phases 22. (Ca+Sr)/(Zr+Ti) in the second segregation phases 22 is preferably 1.15 or more, and more preferably 1.39 or more. Si/(Zr+Ti) in the second segregation phases 22 is preferably 0.10 or more, and more preferably 0.20 or more. Because Zr and Ti may not be substantially included in the second segregation phases 22, the upper limits of (Ca+Sr)/(Zr+Ti) and Si/(Zr+Ti) are not limited.

Although the detailed composition of the second segregation phases 22 is not limited, the second segregation phases 22 preferably have an orthorhombic crystal system. Examples of an orthorhombic composite oxide containing Ca and Si include $Ca_2SiO_4$.

When the second segregation phases 22 having such predetermined characteristics are included in the dielectric composition with the first segregation phases 21, the fracture toughness of the dielectric composition is further improved.

The second segregation phases 22 may have an average grain size of 4.0 μm or less, and preferably 0.1 to 2.5 μm. The average grain size of the second segregation phases 22 is measured similarly to the average grain size of the first segregation phases 21. In other words, the average grain size of the second segregation phases 22 is calculated by identifying at least five second segregation phases 22 using the above-mentioned method and then measuring their equivalent circular diameters with image analysis.

Similarly to the first segregation phases 21, the number ratio of the second segregation phases 22 in the dielectric composition (the ceramic layers 10) is defined using the number (N2) of the second segregation phases 22 included in a unit cross-sectional area (per $μm^2$) of the dielectric composition. N2 is measured similarly to N1. In the present embodiment, preferably, the number ratio (N2) of the second segregation phases 22 is determined to reflect the number ratio (N1) of the first segregation phases 21. Specifically, the ratio of N2 to N1 (N2/N1) may be within a range of 0.2 to 5.0 and preferably 0.5 to 2.0.

As stated above, the ceramic layers 10 (the dielectric composition) of the present embodiment include the predetermined segregation phases 21 and 22, which enable the fracture toughness of the element body 4 to increase. The ceramic layers 10 may include other segregation phases, voids, or the like in addition to the segregation phases 21 and 22. The grain boundaries 23, which are located between the dielectric grains 20, include the constituent elements of the main component and the subcomponent elements, and may include the other segregation phases.

Next, a method of manufacturing the multilayer ceramic capacitor 2 shown in FIG. 1 is explained.

First, a manufacturing process of the element body 4 is explained. In the manufacturing process of the element body 4, a dielectric paste to be the ceramic layers 10 after firing and an internal-electrode paste to be the internal electrode layers 12 after firing are prepared.

The dielectric paste is manufactured using a powder (a main component powder) of the perovskite compound (the main component of the dielectric composition) and a first segregation powder to be the first segregation phases 21 after firing. The main component powder can be manufactured using, a solid phase method, a hydrothermal synthesis method, a sol-gel method, or the like. For example, if the solid phase method is used, uniformly mixing starting raw materials (e.g., a $CaCO_3$ powder, a $SrCO_3$ powder, a $ZrO_2$ powder, and a $TiO_2$ powder) in wet manner and then performing a calcining treatment gives the main component powder. At this time, the calcined main component powder may be appropriately pulverized, classified, etc.

The first segregation powder is manufactured by mixing a compound powder including Ca (e.g., a $CaCO_3$ powder), a compound powder including Al (e.g., an $Al_2O_3$ powder), and a compound powder including Si (e.g., a $SiO_2$ powder) at a predetermined ratio and performing the calcining treatment. The grain size of the first segregation phases 21 can be controlled by pulverizing or performing other treatment on the first segregation powder after calcining treatment.

If the second segregation phases 22 are to be formed in the ceramic layers 10, a second segregation powder may be prepared. Similarly to the first segregation powder, the second segregation powder can be manufactured by calcining a mixture of a compound powder including Ca and a compound powder including Si. Alternatively, because of the ratio of subcomponent raw materials, the second segregation phases 22 may be formed with no preparation of the second segregation powder.

Adding the main component powder and the first segregation powder to an organic vehicle and kneading them gives the dielectric paste. The organic vehicle is a binder dissolved in an organic solvent. The binder to be used is not limited and is appropriately selected from various binders (e.g., polyvinyl butyral, acrylic, and ethyl cellulose). The organic solvent to be used is not limited and is appropriately selected from various organic solvents (e.g., methyl ethyl ketone, methanol, ethanol, acetone, toluene, terpineol, and butyl carbitol).

The above-mentioned dielectric paste is organic paint, but may be water based paint given by kneading the mixed powder and a water based vehicle. In this case, the water based vehicle is produced by dissolving a water-soluble binder, a dispersant, and the like in water. The water-soluble binder to be used is not limited and may be, for example, polyvinyl alcohol, water-soluble acrylic resin, or water-soluble polyvinyl butyral resin. At this time, the second segregation powder, the subcomponent raw materials, and the like may be added as appropriate. The dielectric paste may also include additives selected from the second segregation powder, various dispersants, plasticizers, dielectrics, subcomponent compounds, glass frit, or the like as necessary.

Meanwhile, the internal-electrode paste is produced by kneading a conductive material (e.g., a pure Ni powder and a Ni alloy powder) or a compound to be Ni or the Ni alloy after main firing (e.g., various oxides, organometallic compounds, and resinate) with the organic vehicle mentioned above. At this time, the main component powder included in the dielectric paste may be added as an inhibitor to the internal-electrode paste. The inhibitor prevents sintering of the conductive powder in a firing step.

Next, the dielectric paste is turned into sheets using, for example, a doctor blade method to give ceramic green sheets. The internal-electrode paste is then applied onto the ceramic green sheets in a predetermined pattern using a printing method (e.g., screen printing) or a transfer method. The green sheets with the internal electrode patterns are laminated and then pressed in the lamination direction to give a mother laminated body. At this time, the ceramic green sheets and the internal electrode patterns are laminated so that the ceramic green sheets are located on the upper and lower surfaces of the mother laminated body in the lamination direction.

The mother laminated body given by the above-mentioned process is cut into a predetermined size by dicing or push-cutting to give green chips. If necessary, the green chips may be subjected to solidification drying so that the plasticizer and the like are removed, and may then be subjected to barrel polishing using a horizontal centrifugal barrel machine or the like. In the barrel polishing, the green chips are put into a barrel together with media and a polishing liquid, and a rotational movement or vibration is applied to the barrel. By barrel polishing, unwanted parts (e.g., burrs generated during cutting) are removed, and the corners of the green chips are rounded. The green chips after barrel polishing are washed with a cleaning solution (e.g., water) and dried. Barrel polishing may be performed after the green chips are fired.

Next, each green chip given above is subjected to a binder removal treatment and a firing treatment to give the element body 4.

Conditions of the binder removal treatment are not limited and are appropriately determined based on the main component composition of the ceramic layers 10 and the main component composition of the internal electrode layers 12. For example, the heating rate is preferably 5 to 300° C./hour, the holding temperature is preferably 180 to 400° C., and the temperature holding time is preferably 0.5 to 24 hours. The binder removal atmosphere is air or a reducing atmosphere.

Conditions of the firing treatment are not limited and are appropriately determined based on the main component composition of the ceramic layers 10 and the main component composition of the internal electrode layers 12. For example, the holding temperature during firing is preferably 1200 to 1350° C. and is more preferably 1220 to 1300° C., and the temperature holding time during firing is preferably 0.5 to 8 hours and is more preferably 1 to 3 hours. The firing atmosphere is preferably a reducing atmosphere. For example, a humidified mixed gas of $N_2$ and $H_2$ may be used as the ambient gas. When the internal electrode layers 12 include a base metal (e.g., Ni and a Ni alloy), the oxygen partial pressure in the firing atmosphere is preferably $1.0 \times 10^{-14}$ to $1.0 \times 10^{-10}$ MPa.

After the firing treatment, annealing may be performed as necessary. Annealing is a treatment for reoxidizing the ceramic layers 10. If the firing treatment has been performed in the reducing atmosphere, annealing is preferably performed. Annealing conditions are not limited and are appropriately determined based on, for example, the main component composition of the ceramic layers 10. For example, the holding temperature is preferably 950 to 1150° C., the temperature holding time is preferably 0 to 20 hours, and the heating rate and the cooling rate are preferably 50 to 500° C./hour. A humidified $N_2$ gas or the like is preferably used as the ambient gas, and the oxygen partial pressure in the annealing atmosphere is preferably $1.0 \times 10^{-9}$ to $1.0 \times 10^{-5}$ MPa.

In the binder removal treatment, the firing treatment, and the annealing treatment, a wetter, for example, is used to humidify the $N_2$ gas, the mixed gas, or the like. In this case, the water temperature is preferably about 5 to 75° C. The binder removal treatment, the firing treatment, and the annealing treatment may be performed consecutively or independently.

Next, the pair of external electrodes 6 is formed on the outer surfaces of the element body 4 given above. The external electrodes 6 are formed by any method. For example, when baked electrodes are formed as the external electrodes 6, a conductive paste including glass frit is applied to the end surfaces of the element body 4 by a dip method, and then the element body 4 is heated at a predetermined temperature. When resin electrodes are formed as the external electrodes 6, a conductive paste including a thermosetting resin is applied to the end surfaces of the element body 4, and then the element body 4 is heated at a temperature at which the thermosetting resin hardens. After the baked electrodes or the resin electrodes are formed by the above-mentioned method, sputtering, vapor deposition, electrolytic plating, electroless plating, or the like may be performed to give the external electrodes 6 having a multilayer structure.

The above-mentioned process gives the multilayer ceramic capacitor 2 including the external electrodes 6.

Summary of Embodiment

The multilayer ceramic capacitor 2 according to the present embodiment includes the element body 4 containing the alternately laminated ceramic layers 10, which are composed of the predetermined dielectric composition, and the alternately laminated internal electrode layers 12. The dielectric composition of the ceramic layers 10 includes the dielectric grains 20 containing the perovskite compound and the first segregation phases 21 containing at least Ca, Al, Si and O.

Such characteristics of the dielectric composition of the ceramic layers 10 increase its fracture toughness. The reason why the fracture toughness increases is not necessarily clarified. However, it is assumed that the reason is attributed to improvement of joint strength between the dielectric grains caused by the first segregation phases 21 including the predetermined elements. It is also assumed that, even if a crack initiation point is produced inside the dielectric composition, the first segregation phases 21 can prevent crack growth. In the multilayer ceramic capacitor 2 of the present embodiment, defects (e.g., cracks) of the element body 4 can be sufficiently prevented, because the ceramic layers 10 include the dielectric composition having high fracture toughness. The multilayer ceramic capacitor 2 also exhibits high durability against external force or impact.

Particularly, by controlling the element ratios (Al/(Al+Si) and Ca/(Zr+Ti)) in the first segregation phases 21, the average grain size thereof, and the number ratio (N1) thereof within the predetermined ranges, the fracture toughness of the dielectric composition is further improved and the dielectric composition has high relative permittivity.

The ceramic layers 10 (the dielectric composition) include the second segregation phases 22, which include at least Ca, Si, and O and substantially exclude Al. When the dielectric composition includes the second segregation phases 22, the fracture toughness of the dielectric composition is further improved.

Hereinbefore, an embodiment of the present disclosure is explained, but the present disclosure is not limited to the above-mentioned embodiment and can be modified variously without departing from the gist of the present disclosure.

The multilayer ceramic capacitor 2 exemplifies a multilayer ceramic electronic device of the present embodiment. However, a multilayer ceramic electronic device of the present disclosure may be, for example, a bandpass filter, a multilayer three-terminal filter, a thermistor, or a varistor.

In the present embodiment, the ceramic layers 10 and the internal electrode layers 12 are laminated in the Z-axis direction. However, the lamination direction may be the X-axis direction or the Y-axis direction. In that case, the external electrodes 6 are formed according to the exposed surfaces of the internal electrode layers 12. The internal electrode layers 12 may be drawn out to an outer surface of the element body 4 via through-hole electrodes. In that case, the through-hole electrodes and the external electrodes 6 are electrically connected.

EXAMPLES

Hereinafter, the present disclosure is explained based on further detailed examples. However, the present disclosure is not limited to the examples.

Experiment 1

In Experiment 1, capacitor samples according to Examples 1 and 2 and Comparative Examples 1 to 4 were manufactured in the following manner.

Example 1

First, a main component powder and a first segregation powder were prepared as raw materials of a dielectric paste. Specifically, the main component powder was a $(Ca_{0.7}Sr_{0.3})(Zr_{0.96}Ti_{0.04})O_3$ powder manufactured using a solid phase method. The first segregation powder was manufactured by mixing a $CaCO_3$ powder, an $Al_2O_3$ powder, and a $SiO_2$ powder in wet manner at a predetermined ratio, calcining the mixture, and then pulverizing it in a ball mill.

Next, the main component powder, the first segregation powder, an organic vehicle, and a subcomponent powder (a $MnCO_3$ powder) were kneaded to give the dielectric paste. Also, a Ni powder and an organic vehicle were kneaded to give an internal-electrode paste.

Next, green chips were manufactured by a sheet method using the dielectric paste and the internal-electrode paste. Each green chip was then subjected to a binder removal treatment, a firing treatment, and an annealing treatment to give an element body 4 having dimensions of L0×W0×T0=3.25 mm×1.75 mm×1.75 mm. In the element body 4, the number of ceramic layers 10 sandwiched between internal electrode layers 12 was 250. The average thickness of the ceramic layers 10 was 2.5 μm. The average thickness of the internal electrode layers 12 was 1.1 μm. The above-mentioned process gave the capacitor samples according to Example 1.

Example 2

In Example 2, a barium titanate powder (a $BaTiO_3$ powder) manufactured by a hydrothermal synthesis method was used as the main component powder added to the dielectric paste. Except that the main component of the ceramic layers 10 was changed to $BaTiO_3$, capacitor samples according to Example 2 were manufactured as in Example 1.

Comparative Example 1

In Comparative Example 1, the dielectric paste was prepared without using the first segregation powder. In other words, the dielectric paste used in Comparative Example 1 was manufactured from a mixture of the main component powder including $(Ca_{0.7}Sr_{0.3})(Zr_{0.96}Ti_{0.04})O_3$, the subcomponent powder (the same subcomponents as in Example 1), and the organic vehicle. Except for above condition, capacitor samples according to Comparative Example 1 were manufactured as in Example 1.

Comparative Example 2

In Comparative Example 2, a $SiO_2$ powder, instead of the first segregation powder, was added to the dielectric paste. The dielectric paste used in Comparative Example 2 was manufactured from a mixture of the main component powder including $(Ca_{0.7}Sr_{0.3})(Zr_{0.96}Ti_{0.04})O_3$, the $SiO_2$ powder, the subcomponent powder (the same subcomponents as in Example 1), and the organic vehicle. Except for the above condition, capacitor samples according to Comparative Example 2 were manufactured as in Example 1.

Comparative Example 3

In Comparative Example 3, an $Al_2O_3$ powder and a $SiO_2$ powder were mixed and calcined to prepare a composite oxide powder, instead of using the first segregation powder. The dielectric paste used in Comparative Example 3 was manufactured from a mixture of the Al—Si—O-based composite oxide powder, the main component powder including $(Ca_{0.7}Sr_{0.3})(Zr_{0.96}Ti_{0.04})O_3$, the subcomponent powder (the same subcomponents as in Example 1), and the organic vehicle. Except for the above condition, capacitor samples according to Comparative Example 3 were manufactured as in Example 1.

Comparative Example 4

In Comparative Example 4, a barium titanate powder (a $BaTiO_3$ powder) manufactured by the hydrothermal synthesis method was prepared as the main component powder added to the dielectric paste, as in Example 2. Also, instead of using the first segregation powder, an $Al_2O_3$ powder and a $SiO_2$ powder were mixed and calcined to prepare a composite oxide powder in Comparative Example 4. The dielectric paste used in Comparative Example 4 was manufactured from a mixture of the main component powder including $BaTiO_3$, the Al—Si—O-based composite oxide powder, the subcomponent powder (the same subcomponents as in Example 1), and the organic vehicle. Except for the above conditions, capacitor samples according to Comparative Example 4 were manufactured as in Example 1.

The capacitor samples according to each Example and each Comparative Example of Experiment 1 were subjected to the following evaluation.

Analysis of Segregation Phases

In Experiment 1, a cross section of each capacitor sample was observed by SEM, and mapping analysis and point analysis with EDS were performed at that time to identify constituent elements of segregation phases in the ceramic layers 10. Table 1 shows the results of measurement in each Example and each Comparative Example.

Barrel Polishing Test

In Experiment 1, a barrel polishing test was conducted to evaluate fracture toughness of the dielectric composition of the ceramic layers 10. Specifically, the element bodies after firing, mullite balls (media), SiC abrasive, and water were put into a barrel tub, and the barrel tub was disposed on the periphery of a turret so as to be revolvable. Rotation of the turret made each barrel tub revolve in the direction opposite the rotational direction of the turret. In other words, the barrel tub revolved through planetary motion. The test was conducted under two different conditions (polishing time: 2 hours and polishing time: 8 hours). After that, the element bodies taken out of the barrel tub were dried, and then appearance of each element body was examined with a stereo microscope. The number of the samples with defects (e.g., cracks and chips in corners) was measured.

For each Example and each Comparative Example, one hundred samples were subjected to the barrel polishing test under the condition of 2-hour polishing and another one hundred samples were subjected to the test under the condition of 8-hour polishing to measure the defect rate. The fracture toughness was deemed "good" when the defect rate under the condition of 2-hour polishing was 0%, and was deemed "better" when the defect rate under the condition of 8-hour polishing was 0%. Table 1 shows the results of the test for each Example and each Comparative Example.

TABLE 1

| | | Segregation phases | | Barrel polishing test Defect rate (%) | |
|---|---|---|---|---|---|
| Sample No. | Main component composition | Included or not | Constituent elements | 2-hour polishing | 8-hour polishing |
| Comparative Example 1 | $(Ca_{0.7}Sr_{0.3})(Zr_{0.96}Ti_{0.04})O_3$ | Not included | — | 7 | 15 |
| Comparative Example 2 | $(Ca_{0.7}Sr_{0.3})(Zr_{0.96}Ti_{0.04})O_3$ | Included | Si, O | 4 | 8 |
| Comparative Example 3 | $(Ca_{0.7}Sr_{0.3})(Zr_{0.96}Ti_{0.04})O_3$ | Included | Si, Al, O | 2 | 5 |
| Example 1 | $(Ca_{0.7}Sr_{0.3})(Zr_{0.96}Ti_{0.04})O_3$ | Included | Ca, Si, Al, O | 0 | 0 |
| Comparative Example 4 | $BaTiO_3$ | Included | Si, Al, O | 6 | 11 |
| Example 2 | $BaTiO_3$ | Included | Ca, Si, Al, O | 0 | 2 |

As shown in Table 1, Example 1, in which Ca—Si—Al—O-based first segregation phases 21 were included, had a reduced defect rate of the barrel polishing test compared to Comparative Examples 1 to 3. Similarly, Example 2, in which the Ca—Si—Al—O-based first segregation phases 21 were included, had a reduced defect rate of the barrel polishing test compared to Comparative Example 4. This result indicates that the fracture toughness of the dielectric composition was improved and defects of the capacitor samples caused by external impact were prevented by including the Ca—Si—Al—O-based first segregation phases 21 in the dielectric composition (the ceramic layers).

As shown in Table 1, Example 1 had a lower defect rate under the condition of 8-hour polishing than Example 2. From this result, it was found that the fracture toughness of the dielectric composition was further improved by forming the first segregation phases 21 in the calcium zirconate-based main component.

Experiment 2

In Experiment 2, capacitor samples of Examples 10 to 16 having different element ratios (Al/(Al+Si) and Ca/(Zr+Ti)) of the first segregation phases 21 were manufactured. The element ratios of the first segregation phases 21 were controlled by adjusting the ratio of the starting raw materials (the $CaCO_3$ powder, the $Al_2O_3$ powder, and the $SiO_2$ powder) during manufacture of the first segregation powder. The element ratios of the first segregation phases 21 in each of the Examples 10 to 16 were measured by SEM-EDX. Except for the above conditions, experimental conditions of Experiment 2 were the same as in Example 1 of Experiment 1. Table 2 shows the results of evaluation of Examples 10 to 16 in Experiment 2.

TABLE 2

Results of segregation phase analysis

| | | Element ratios | | Barrel polishing test |
|---|---|---|---|---|
| Sample No. | Constituent elements | Al/ (Al + Si) | Ca/ (Zr + Ti) | 8-hour polishing Defect rate (%) |
| Example 10 | Ca, Si, Al, O | 0.52 | 2.6 | 1 |
| Example 11 | Ca, Si, Al, O | 0.56 | 2.3 | 0 |
| Example 12 | Ca, Si, Al, O | 0.67 | 2.5 | 0 |
| Example 13 | Ca, Si, Al, O | 0.74 | 2.3 | 0 |
| Example 14 | Ca, Si, Al, O | 0.79 | 2.1 | 2 |
| Example 15 | Ca, Si, Al, O | 0.63 | 1.3 | 2 |
| Example 16 | Ca, Si, Al, O | 0.62 | 1.6 | 0 |

From the results of evaluation of Examples 10 to 14 shown in Table 2, it was found that Al/(Al+Si) of the first segregation phases 21 was preferably in a range of 0.55 or more to 0.75 or less. From the results of evaluation of Examples 15 and 16 shown in Table 2, it was found that Ca/(Zr+Ti) of the first segregation phases 21 was preferably 1.50 or more.

Experiment 3

In Experiment 3, capacitor samples of Examples 20 to 24 having different average grain sizes of the first segregation phases 21 and capacitor samples of Examples 25 to 28 having different number ratios (N1) of the first segregation phases 21 were manufactured. The average grain size of the first segregation phases 21 was controlled by adjusting conditions for pulverizing the first segregation powder using a ball mill. The number ratio of the first segregation phases 21 was controlled by adjusting the ratio of the first segregation powder in the dielectric paste. The average grain size and the number ratio of the first segregation phases 21 were measured by SEM-EDX using a method described in the description of the embodiment. Except for the above conditions, experimental conditions of Experiment 3 were the same as in Example 1 of Experiment 1.

Also, in Experiment 3, a baked electrode layer including Cu, a Ni plating layer, and a Sn plating layer were formed in this order on an outer surface of the element body. Then, the relative permittivity of the capacitor samples of each Example was measured. The relative permittivity was calculated by measuring a capacitance using an LCR meter (E4981A Capacitance Meter manufactured by KEYSIGHT TECHNOLOGIES). Specifically, in the measurement of the capacitance, the measurement temperature was 20° C., and a signal having a frequency of 1 kHz and an input signal level (measurement voltage) of 1 Vrms was input to the capacitor samples. Then, the relative permittivity (no unit) was calculated using the thickness of the dielectric layers, the effective electrode area, and the measured capacitance.

Ten samples were subjected to the measurement in each Example to calculate the average value. A relative permittivity of 30 or more was deemed good. Table 3 shows the results of evaluation of Examples 20 to 28 in Experiment 3.

Si/(Zr+Ti) was preferably 0.10 or more. In each of Examples 31 and 32, Al/(Al+Si) of the second segregation phases 22 was less than 0.10, and the second segregation phases 22 substantially did not include Al.

TABLE 3

| | Results of segregation phase analysis | | | Barrel polishing test | Relative permittivity (—) |
|---|---|---|---|---|---|
| Sample No. | Constituent elements | Average grain size µm | Number ratio: N1 number per µm² | 8-hour polishing Defect rate (%) | |
| Example 20 | Ca, Si, Al, O | 0.06 | 0.0031 | 2 | 33 |
| Example 21 | Ca, Si, Al, O | 0.12 | 0.0011 | 0 | 33 |
| Example 22 | Ca, Si, Al, O | 0.9 | 0.0026 | 0 | 33 |
| Example 23 | Ca, Si, Al, O | 2.3 | 0.0048 | 0 | 31 |
| Example 24 | Ca, Si, Al, O | 3.1 | 0.0049 | 0 | 29 |
| Example 25 | Ca, Si, Al, O | 0.9 | 0.0004 | 1 | 34 |
| Example 26 | Ca, Si, Al, O | 0.7 | 0.0007 | 0 | 33 |
| Example 27 | Ca, Si, Al, O | 1.1 | 0.0080 | 0 | 32 |
| Example 28 | Ca, Si, Al, O | 0.6 | 0.0120 | 0 | 29 |

From the results of evaluation of Examples 20 to 24 shown in Table 3, it was found that the average grain size of the first segregation phases 21 was preferably 0.10 µm or more and 2.50 µm or less. From the results of evaluation of Examples 25 to 28 shown in Table 3, it was found that the number ratio (N1) of the first segregation phases 21 was preferably 0.0005 or more and 0.0100 or less per µm².

Experiment 4

In Experiment 4, a second segregation powder was prepared by mixing a $CaCO_3$ powder and a $SiO_2$ powder and calcining the mixture. The second segregation powder was added to the dielectric paste together with the first segregation powder to give capacitor samples according to Examples 31 and 32. Except for the above conditions, experimental conditions of Experiment 4 were the same as in Example 22 of Experiment 3.

In Experiment 4, the barrel polishing test for an extended polishing time (longer than in Experiments 1 to 3) was conducted. The test under the condition of 16-hour polishing was conducted. The fracture toughness was deemed "best" when the defect rate under the condition of 16-hour polishing was 0%. Table 4 shows the results of evaluation of Examples 31 and 32 in Experiment 4. Note that Table 4 shows the results of evaluation of Example 22 of Experiment 3, in which the second segregation phases 22 were not included, as well as the results of evaluation of Examples 31 and 32, in which the second segregation phases 22 were included.

DESCRIPTION OF THE REFERENCE NUMERALS 2 multilayer ceramic capacitor
4 element body
4a end surface
4b side surface
10 ceramic layer
12 internal electrode layer
20 dielectric grain
21 first segregation phase
22 second segregation phase
23 grain boundary
6 external electrode

What is claimed is:

1. A dielectric composition comprising:
a dielectric grain including a perovskite compound; and
a first segregation phase including at least Ca, Al, Si, and O.

2. The dielectric composition according to claim 1, wherein
a molar ratio (Al/(Al+Si)) of Al to a total of Al and Si in the first segregation phase is 0.55 or more and 0.75 or less.

3. The dielectric composition according to claim 1, wherein
the perovskite compound is represented by $ABO_3$,
A-site of $ABO_3$ includes Ca and/or Sr,
B-site of $ABO_3$ includes Zr and/or Ti,

TABLE 4

| | First segregation phases | Second segregation phases | | | Barrel polishing test | |
|---|---|---|---|---|---|---|
| | Constituent | Constituent | Element ratios | | Defect rate (%) | |
| Sample No. | elements | elements | (Ca + Sr)/(Zr + Ti) | Si/(Zr + Ti) | 8-hour polishing | 16-hour polishing |
| Example 22 | Ca, Si, Al, O | — | — | — | 0 | 1 |
| Example 31 | Ca, Si, Al, O | Ca, Si, O | 1.18 | 0.12 | 0 | 0 |
| Example 32 | Ca, Si, Al, O | Ca, Si, O | 1.39 | 0.20 | 0 | 0 |

From the results of evaluation shown in Table 4, it was found that the fracture toughness of the dielectric composition was further improved by including the Ca—Si—O-based second segregation phases 22 excluding Al in addition to the first segregation phases 21 in the dielectric composition. It was also found that (Ca+Sr)/(Zr+Ti) in the second segregation phases 22 was preferably 1.15 or more and that a molar ratio of Ca in the A-site to the entire A-site, which is assumed to be 1 mol, is 0.5 or more, and a molar ratio of Zr in the B-site to the entire B-site, which is assumed to be 1 mol, is 0.8 or more.

4. The dielectric composition according to claim 1, wherein
 a molar ratio (Ca/(Zr+Ti)) of Ca to a total of Zr and Ti in the first segregation phase is 1.50 or more, and
 the molar ratio Ca/(Zr+Ti) in the first segregation phase is higher than that in the dielectric grain.

5. The dielectric composition according to claim 1, wherein
 the dielectric composition further comprises a second segregation phase, and the second segregation phase comprises at least Ca, Si, and O and substantially excludes Al.

6. The dielectric composition according to claim 5, wherein
 (Ca+Sr)/(Zr+Ti) denotes a molar ratio of a total of Ca and Sr to a total of Zr and Ti in the second segregation phase,
 Si/(Zr+Ti) denotes a molar ratio of Si to the total of Zr and Ti in the second segregation phase,
 (Ca+Sr)/(Zr+Ti) is 1.15 or more, and
 Si/(Zr+Ti) is 0.10 or more.

7. The dielectric composition according to claim 1, wherein
 the first segregation phase comprises first segregation phases having an average grain size of 0.10 μm or more and 2.50 μm or less.

8. The dielectric composition according to claim 1, wherein
 the first segregation phase is included at a number ratio of 0.0005 or more and 0.0100 or less per μm$^2$.

9. A multilayer ceramic electronic device comprising the dielectric composition according to claim 1.

* * * * *

UNITED STATES PATENT AND TRADEMARK OFFICE
CERTIFICATE OF CORRECTION

| | | |
|---|---|---|
| PATENT NO. | : 11,894,194 B2 | Page 1 of 1 |
| APPLICATION NO. | : 17/876162 | |
| DATED | : February 6, 2024 | |
| INVENTOR(S) | : Toshihiro Iguchi et al. | |

It is certified that error appears in the above-identified patent and that said Letters Patent is hereby corrected as shown below:

On the Title Page

Please add, after item (65):
-- (30) Foreign Application Priority Data
Sep. 16, 2021 (JP) .................................. 2021-151424 --

Signed and Sealed this
Twenty-first Day of May, 2024

Katherine Kelly Vidal
*Director of the United States Patent and Trademark Office*